United States Patent
Glassman et al.

[11] Patent Number: 5,307,621
[45] Date of Patent: May 3, 1994

[54] ASYMMETRIC WHIRL COMBUSTION

[76] Inventors: Irvin Glassman, 160 Longview Dr., Princeton, N.J. 08540; Richard Yetter, 2106 Yardley Rd., Yardley; Joseph A. Sivo, 162 Walton Dr., Morrisville, both of Pa. 19067

[21] Appl. No.: 110,497

[22] Filed: Aug. 23, 1993

Related U.S. Application Data

[63] Continuation of Ser. No. 783,272, Oct. 28, 1991, abandoned.

[51] Int. Cl.⁵ ............................................. F23R 3/58
[52] U.S. Cl. ................................. 60/39.06; 60/755; 431/9
[58] Field of Search ............ 60/39.06, 737, , 748, 60/752, 755, 754; 431/177, 173, 352, 353, 354, 8, 9; 123/301, 306

[56] References Cited

U.S. PATENT DOCUMENTS

| | | | |
|---|---|---|---|
| 1,591,679 | 7/1926 | Hawley | 431/173 |
| 2,695,600 | 11/1954 | Goschel | 123/301 |
| 2,718,757 | 9/1955 | Bloomer et al. | 60/755 |
| 3,808,802 | 5/1974 | Tanasawa | 60/755 |
| 4,151,709 | 5/1979 | Melconian et al. | 60/755 |
| 4,224,905 | 9/1980 | Von Seggern et al. | 123/301 |
| 4,226,083 | 10/1980 | Lewis et al. | 60/39.06 |
| 4,923,861 | 6/1990 | Keller et al. | 431/173 |
| 4,967,050 | 9/1990 | Ho | 431/9 |
| 5,081,844 | 1/1992 | Keller et al. | 60/737 |
| 5,085,575 | 2/1992 | Keller et al. | 431/354 |
| 5,127,821 | 7/1992 | Keller | 431/352 |

Primary Examiner—Richard A. Bertsch
Assistant Examiner—Timothy S. Thorpe
Attorney, Agent, or Firm—Ostrolenk, Faber, Gerb & Soffen

[57] ABSTRACT

A combustion apparatus comprises a combustion chamber disposed about a central longitudinal axis and means to separately introduce oxidant and fuel into the combustion chamber such that when ignited, the resulting diffusion flame swirls about the central axis and exhibits characteristics of a premixed flame. The asymmetric nature of the flame components introduction allows the combustion to be conducted stably at a fuel rich or fuel lean condition and if desired, to extinguish the flame. The fuel oxidant ratio can be reduced such that nitrogen oxide emissions are reduced. Great combustion stability obtained at low equivalence ratios and elimination of possibility of flashback are achieved in the new process and due to the spinning flame, combustion is completed in very short distances.

6 Claims, 2 Drawing Sheets

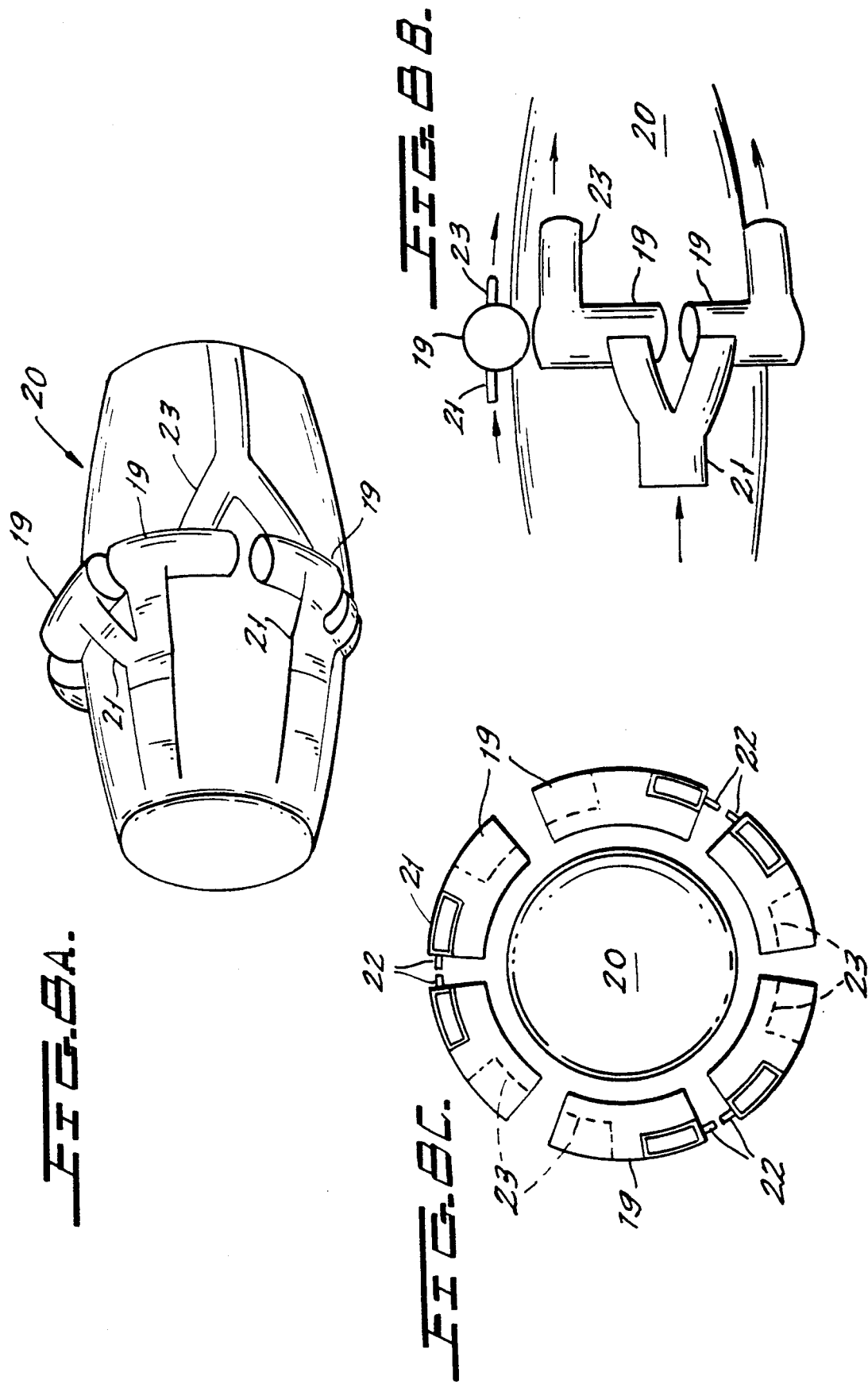

ASYMMETRIC WHIRL COMBUSTION

This is a continuation of U.S. patent application Ser. No. 07/783,272 filed on Oct. 28, 1991, now abandoned.

BACKGROUND OF THE INVENTION

In the quest for low emissions, burners or combustors have been developed based, inter alia, on fundamental research concerning swirling flows, including the phenomenon of vortex breakdown, and on stability of premixed flames. A lean premixing technique can provide $NO_x$ emissions which are below 25 ppm when natural gas is used as a fuel and about 42 ppm when No. 2 oil is used as the fuel. In these burners, frequently a mixture of combustion air and fuel is injected into the combustor by means of a plurality of swirlers.

A free vortex is one of the simplest irrotational motions of an incompressible perfect fluid. Vorticity attaches to the fluid and is concentrated on the central axis. Such ideal vortices, however, cannot exist for a variety of reasons including, inter alia, the infinite energy required.

Whirls in the form of dust devils, water spouts and tornadoes occur in nature as the result of the simultaneous occurrence of an ambient vorticity produced for example in the ground boundary layer of a wind or wind shear or from the earth's rotation and a concentrating mechanism such as air rising in a buoyant column. The counterparts of these natural phenomenon, namely fire devils, fire whirls and fire tornadoes have attracted considerable interest in studies of fire which have been conducted over the last several years.

Laboratory studies on fire whirls were conducted by Byram and Martin (Fire Whirlwinds In The Laboratory, Fire Control Notes, January 1962, U.S. Forest Service) by positioning a stationary wall around a flame with the wall being interrupted by two vertical slots arranged so as to admit air in a tangential direction. Emmons and Ying, The Fire Whirl, 11th Symposium (Int'l) on Combustion, The Combustion Institute, Pittsburgh, Pa. p. 475 (1967), describes a similar laboratory apparatus except that a rotating screen is used in place of the simpler slotted device. In both instances, cylindrical symmetry was observed. The fuel container and a tall cylindrical screen are arranged so as to be concentric. When the fuel is ignited and begins to burn, the screen is rotated and this in turn causes a rotation of the air. Since the angular momentum must be conserved, the rotational speed of the air near the fuel container is many times faster than that induced by the rotating screen or tangential air injection and as a result, the rotational air speed around the fuel is the air speed of the screen times the radius of the circular screen divided by the radius of the fuel container or nozzle. A swirling elongated flame is produced.

The present invention is based on the discovery that by introducing asymmetry to a fire whirl type configuration, a variety of advantageous effects can be achieved. Nitrogen oxide emissions in all types of combustors such as fuel burners, furnaces, automobile and gas turbine engine can be reduced. Fires such as oil well fires can be extinguished.

It is accordingly the object of this invention to provide a new controllable method for the combustion of a fuel which allows the combustion and the results of the combustion to be controlled and to provide apparatus for effecting the method. These and other objects of the invention will become apparent to those of ordinary skill in this art from the following detailed description in which FIG. 1A is a cross-section of a rotating screen fire whirl device of the prior art;

FIGS. 8A, 8B, and 8C are a prospective view, plan view and cross-section, respectively, of a gas turbine and combustors of the invention.

SUMMARY OF THE INVENTION

This invention relates to new combustion apparatus and the method for employing that apparatus. More particularly, a combustion apparatus is provided in which a combustion chamber is disposed about a central longitudinal axis and has means to separately introduce air and fuel into the combustion chamber such that when ignited the resulting diffusion flame swirls around the central axis and exhibits characteristics of a premixed flame. The combustion chamber is asymmetrically disposed relative to the flow of fuel introduced into the chamber and this can be accomplished by offsetting the introduction point or by altering the configuration of the wall(s). The characteristics of the combustion flame can be controlled such that low nitrogen oxide emissions can be achieved or the flame can be extinguished in its entirety.

DESCRIPTION OF THE INVENTION

Figure 1A:
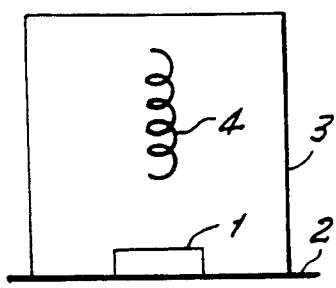
FIG. 1B is a top view of the rotating screen fire whirl device of FIG. 1.
Figure 1B:
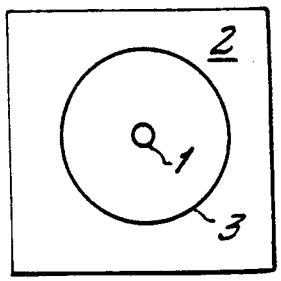

A cross section of the apparatus used by Emmons et al., supra, to produce a fire whirl during fire studies is shown in FIG. 1A. A fuel container 1 is mounted on a fixed plate 2. A rotatable cylindrical screen 3 is positioned on plate 2 so that the fuel container 1 is symmetrically disposed relative to the screen 3. When screen 3 is rotated, the movement of the air in the vicinity of fuel container 1 is much faster than in the vicinity of screen 3 so that the fuel when ignited results in an elongated flame 4 which swirls about the central longitudinal axis of cylinder 3. Flame 4 is a typically luminous diffusion flame. Thus, typical of diffusion flames, i.e. where the fuel and oxidant are separately introduced into the combustion chamber, an orange glow is apparent. As is apparent from FIG. 1B, the fuel and air sources are symmetrically disposed.

Figure 2:
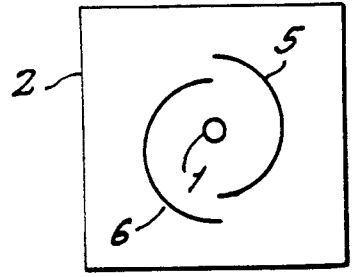
FIG. 2 is a top view of a first embodiment of a device in accordance with the invention using a split cylinder configuration.

The present invention imposes an asymmetry on fire whirl configurations such as that shown in FIG. 1. This can be accomplished in many ways. A top view of one embodiment is shown in FIG. 2. The fuel cylinder 1 and support plate 2 are disposed as in FIG. 1. In this case, however, the screen is divided into two hemispherical segments 5 and 6 which are positioned so that their central axes do not coincide. As is apparent, the distance from fuel compartment 1 to the wall of the screen 5 is not constant about the entire circumference of fuel compartment 1.

Figure 3:
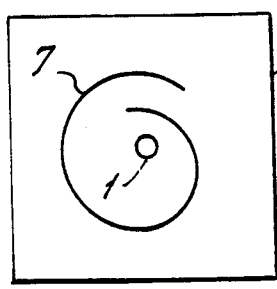
FIG. 3 is a top view of a second embodiment of a device according to the invention using a helical cylinder configuration asymmetric with the fuel.

A second embodiment which accomplishes the same result is shown in FIG. 3. Here the shape of the screen has been configured into that of a helix 6. As in the case of the configuration shown in FIG. 2, the configuration shown in FIG. 3 also has a distance from fuel container I to the screen which varies about the circumference of fuel container 1. In both cases, an asymmetry of the screen has been imposed relative to the fuel container.

Air or other oxidant is induced into the combustion chamber by hemispherical segments 5, 6 or helix 7 or by injecting air or the like. In either case, the air introduction is generally tangential to the fuel source and rotates around that fuel source such as fuel container I. The induced vortical flow which results causes the flame to seek a position within the combustion chamber which is generally concentric. However, because of the asymmetry resulting from the altered wall configuration, the rotating induced air also sweeps across the fuel source resulting in a mixing with the fuel and creating a flame that has the characteristics of a premixed flame.

The combuster configurations shown in each of FIGS. 1, 2 and 3 create a diffusion flame, that is the type of flame which is created when a fuel and oxidant are introduced into a combustion chamber separately. As asymmetry is imposed on the system as shown, for instance, in FIGS. 2 and 3, the typical orange appearing diffusion flame becomes light blue which is a characteristic of a premixed hydrocarbon flame. This is the result of the air sweeping across and mixing with the fuel. When the sweep of air becomes sufficiently great, the flame will extinguish. Thus, for instance the configuration shown in FIG. 2 will maintain a light blue flame while the configuration in FIG. 4 will cause the same flame to extinguish. For any given rate of induced air flow, the characteristics or extinguishment of the flame is a function of the degree of asymmetry, and vice versa.

Figure 4:
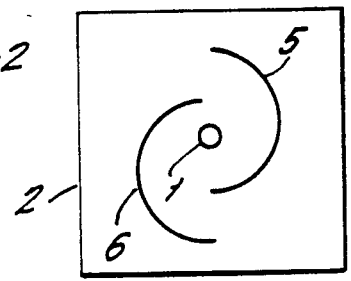
FIG. 4 is a top view of the first embodiment device of the invention using the split cylinder configuration in a second position.

The method of the invention can, therefore be used to extinguish an oil well fire. A split screen can be positioned around the well head with the screen segments offset from one another mimicking the configuration is shown in FIG. 2. Air is induced by the fire and/or injected between the cylinder segments and the degree of asymmetry, i.e. the lateral displacement, is increased to that mimicking what is shown in FIG. 4, resulting in extinguishment of this fire. This was demonstrated in the laboratory using a device as shown in FIG. 2. The fuel burner 1 had a diameter of about 1 centimeter and screen segments 5, 6 were initially disposed symmetrically to form a cylinder having an outside diameter of about 10 cm. Either methane or propane was injected at a rate of about 0.15 cm/sec and then the screen segments 5, 6 were laterally offset until they reached the position shown in FIG. 4, whereupon in both instances the flame extinguished.

Figure 5:
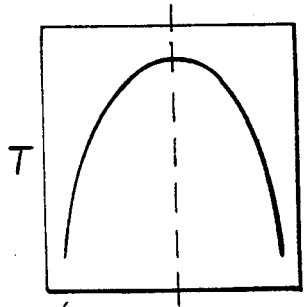
FIG. 5 is a graph of adiabatic flame temperature relative to equivalence ratio.

In a diffusion flame, the rate of burning is determined by the rate of diffusion of the fuel and air which exists at the flame front toward one another in order to create a stoichiometric flame front. This type of system has two fundamental temperatures associated with it. These are (a) the stoichiometric temperature for a given fuel and air which exists at the flame front and (b) a temperature which exists at the exit of the combustor and corresponds to the overall volumetric flow fuel to air ratio. The stoichiometric temperature is the highest temperature which can be achieved with the particular fuel in air. In contrast, when the fuel and air are premixed, as is possible with gaseous fuels and air, the rate of consumption is dominated by chemical reaction rates rather than diffusion rates. As a result, fundamentally only one temperature exists and it corresponds to volumetric flow fuel/air ratio. When precisely the correct amount of air on a molar basis is present to convert all of the carbon in the fuel to carbon dioxide and all of the hydrogen into water vapor, the ratio is called the stoichiometric mixture ratio. The equivalence ratio ($\phi$) is defined as the ratio of the actual fuel/air ratio divided by the stoichiometric ratio. A stoichiometric mixture will therefore have an equivalence ratio of 1. When the system has more air than stoichiometric, the equivalence ratio will be less than 1 and under these circumstances the mixture is termed fuel lean. Similarly, a system that has less than the stoichiometric amount of air will have an equivalence ratio greater than 1 and is termed fuel rich. The flame temperature as a function of equivalence ratio is shown in FIG. 5.

In all diffusion flame combustion systems, the stoichiometric flame temperature is reached regardless of the overall fuel/air mixture ratio. These stoichiometric temperatures are sufficiently large that substantial quantities of nitrogen oxides are formed. Governmental regulations resulting from environmental considerations have required large reductions in nitrogen oxide emissions from furnaces, automobiles, gas turbine engines and the like. One of the features of the asymmetric combustion of the present invention is that a diffusion flame is transformed into a premixed turbulent flame inside the combustion chamber and this allows nitrogen oxide emissions to be substantially reduced since the system can operate stably at very lean equivalence ratios (about 0.5 for instance). Also the possibility of flash back that usually occurs when there is premixing prior to injection into the combustion chamber is eliminated in the present system.

The asymmetric combustion of the present invention creates a premixed flame even though the fuel and air are introduced separately into the combustion chamber. By having a forced air whirl at the circumference in the asymmetric casing, air in amounts greater than stoichiometric can enter the combustion zone. As the flame becomes very lean, the temperature becomes substantially reduced. When the fuel air ratio is adjusted so that it is about ½ of the stoichiometric value ($\phi=0.5$), this results in a reduction of the temperature to substantially below that at which the nitrogen oxides form. The combustion is still sufficiently efficient that carbon monoxide and unburned hydrocarbons are concomitantly reduced. Very stable, spinning flames are formed surrounded by spinning air. Also since the flame seeks to be symmetric to the chamber, the combustion process itself occurs in the core of the burner chamber and the walls of the chamber are much cooler than in the usual combustors. Still further, due to the spinning flame, combustion is completed in very short distances.

The combustion process of the instant invention can use any type of fuel and any type of oxidant therefore. Thus, any type of a combustible matter such as, for instance, oil or a hydrocarbon can be used in solid, liquid or vapor form and any oxidant therefore, such as air, oxygen and oxygen enriched air can be employed. The fuel may be atomized, preheated, etc. as desired.

Figure 6B:
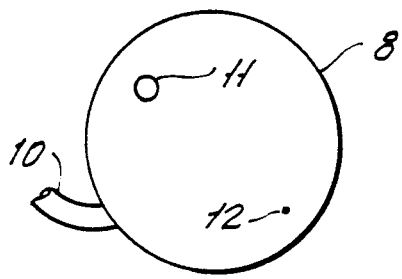
FIGS. 6A and 6B are a cross-section and top view, respectively, of a furnace burner arranged in accordance with the present invention for low emissions.
Figure 6A:
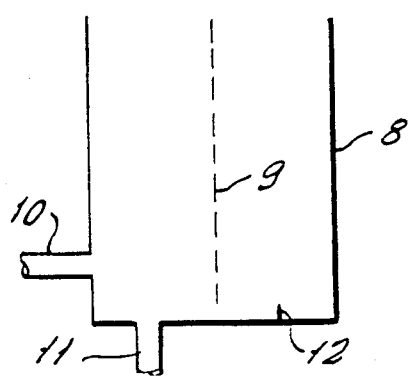

The application of the asymmetric configuration of the present invention applied to a furnace burner, particularly those using natural gas, is illustrated in FIG. 6A. The combustion chamber 8 in this embodiment is cylindrical and symmetrical around a central longitudinal axis designated as 9. Combustion air is introduced into the burner through a conduit 10 such that the flow is generally tangential to central axis 9. The fuel is introduced into combustion chamber 8 through conduit 11. Conduit 11 is arranged so that the fuel flow into combustion chamber 8 is offset from central longitudinal axis 9, although it is generally parallel to axis 9. The asymmetry of this configuration is readily apparent from the top view of the furnace burner of FIG. 6B. A suitable ignition device such as a spark plug 12 is provided at any convenient location within chamber 8.

The configuration shown in FIGS. 6 has a number of great advantages including the fact that there is no flashback possible, no flame holder is required, great stability under lean conditions is obtained and the spinning flame height and cylinder length using this type of forced air whirl condition is very short. The great stabilities achieved in this vertical configuration by overpowering the buoyancy force with the induced air in order to obtain a highly turbulent, rotating flame approaches ideal stirred reactor conditions.

Figure 7B:
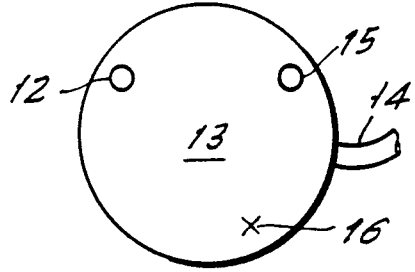
FIGS. 7A and 7B are a cross-section and top view, respectively, of an automotive cylinder configured in accordance with the present invention for low emissions.
Figure 7A:
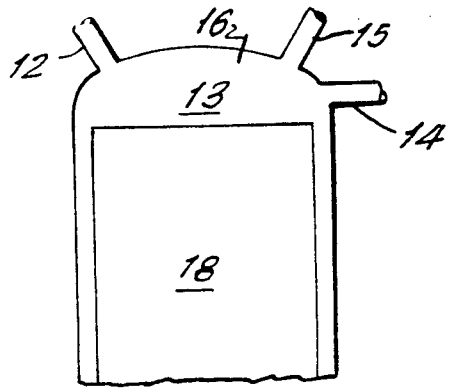

The application of the asymmetric fire whirl configuration of FIGS. 6 to automotive cylinders is shown in FIGS. 7A and 7B. Normal or supercharged air is introduced into combustion chamber 13 through conduit 14 generally tangentially to the center line of the chamber. Fuel is injected through a conduit 15 along an axis offset from the central axis of chamber 13. Combustion is initiated by spark plug 16. As is typical in automotive cylinders, the chamber 13 is provided with a valve exhaust 17 and a piston 18. Application of the asymmetric combustion to diesel engines is similar.

FIGS. 8A, 8B and 8C show the application of the asymmetric gas whirl to a gas turbine combustion arrangement which can be used for both stationary and mobile type turbines. A plurality of combustion chambers 19 are disposed around the circumference of a gas turbine 20. Compressor air is introduced into each combustion chamber 19 through conduits 21 which are disposed so as to cause the air to flow tangentially relative to the central longitudinal axis of chamber 19. Fuel is introduced through conduits 22 along an axis which is generally parallel to the central longitudinal axis but offset therefrom. A spark plug or other ignition device (not shown) is provided for igniting the fuel/air mixture and an exhaust duct 23 leading to the gas turbine 20 is provided at the opposite end of the combustion chamber. In the embodiment shown in FIG. 8, the exhaust outlets 23 are substantially perpendicular to the longitudinal axis of chamber 19 but other arrangements may be utilized. In the embodiment shown, the air to fuel velocity ratio should be about 2 or greater and the momentum air to fuel ratio is preferably about 100 and greater.

A single combustion chamber configured as shown in FIGS. 8 and operated with a fuel/air ratio of about ½ of the stoichiometric value was observed to have reduced the burning temperature substantially below that at which nitrogen oxides formed. Carbon monoxide and unburned hydrocarbon emissions had been also reduced relative to those achieved when the fuel/air ratio was stoichiometric.

As shown, the configuration of FIGS. 8 permits a plurality of combustion chambers to be arranged circumferentially about the engine axis in a gas turbine compared to the longitudinal arrangement presently used, and also permits each axis to be more in a horizontal position. Although such a configuration would possibly increase the overall diameter of the engine, it would appreciably reduce the length of the engine. This type of configuration provides great advantages in that there is no flashback possible, no flame holder is required, there is greater stability under lean conditions, spinning flame height and cylinder height is very short, the combustion chamber wall is cooler and the engine length is shorter. The system described approaches an ideal premixed gas turbine combustion configuration whether the fuel is a gas, liquid or a slurry containing fine solid fuel particles. Even greater stability is obtained in the circumferential configuration described compared to any vertical type combustor due to the greater facility of overcoming buoyancy forces.

The system of asymmetric whirl combustion can also be applied to rocket systems, particularly those using hydrogen and oxygen in both gaseous and liquid states. In such cases, the hydrogen which is used as a regenerative coolant is introduced into the rocket chamber in the whirl tangential manner described hereinbefore and the oxygen is injected through the normal injection plate at positions near the outer radii of the cylindrical rocket combustion chamber. The advantages achieved are more readily manufactured and less costly injectors and greatly reduced heat transfer to the chamber wall. The reduced heat transfer due to the asymmetric whirl combustion created in accordance with the invention, keeping the reacting gases away from the walls, is particularly significant for small thrust rocket motors.

While the present invention has been described in connection with certain preferred embodiments, various changes and modifications can be made without departing from the spirit and scope of the invention. It will accordingly be appreciated that the various embodiments which have been described were for the purpose of illustration only and were not intended to limit the invention.

What is claimed is:

1. A method of combustion in which, separately, fuel without air, and combustion air without fuel, are introduced into a combustion chamber having a generally cylindrical outer surface and a central longitudinal axis, and in which the combustion air is introduced into said chamber generally tangentially to said cylindrical outer surface, and the fuel is introduced into the chamber along an axis generally parallel to said central longitudinal axis, and in which the fuel introduction is asymmetrically disposed relative to said central longitudinal axis, and said air and fuel impact upon their separate introduction into the chamber.

2. A method of combustion according to claim 1 in which a piston means is operated in response to the combustion.

3. A method of combustion according to claim 1 in which the product of the combustion is exhausted from the combustion chamber.

4. A method of combustion according to claim 3 in which the combustion chamber exhaust is conveyed to a turbine.

5. A method of combustion according to claim 4 in which said method is effected in a plurality of combustion chambers disposed so as to exhaust the products of the combustions to the same turbine.

6. A method of combustion according to claim 1 operated to extinguish a flame which comprises increasing the degree of asymmetry until the flame is extinguished.

* * * * *